9138X
G. Gay.
Silk Weaving.
Patented Oct. 6, 1835.
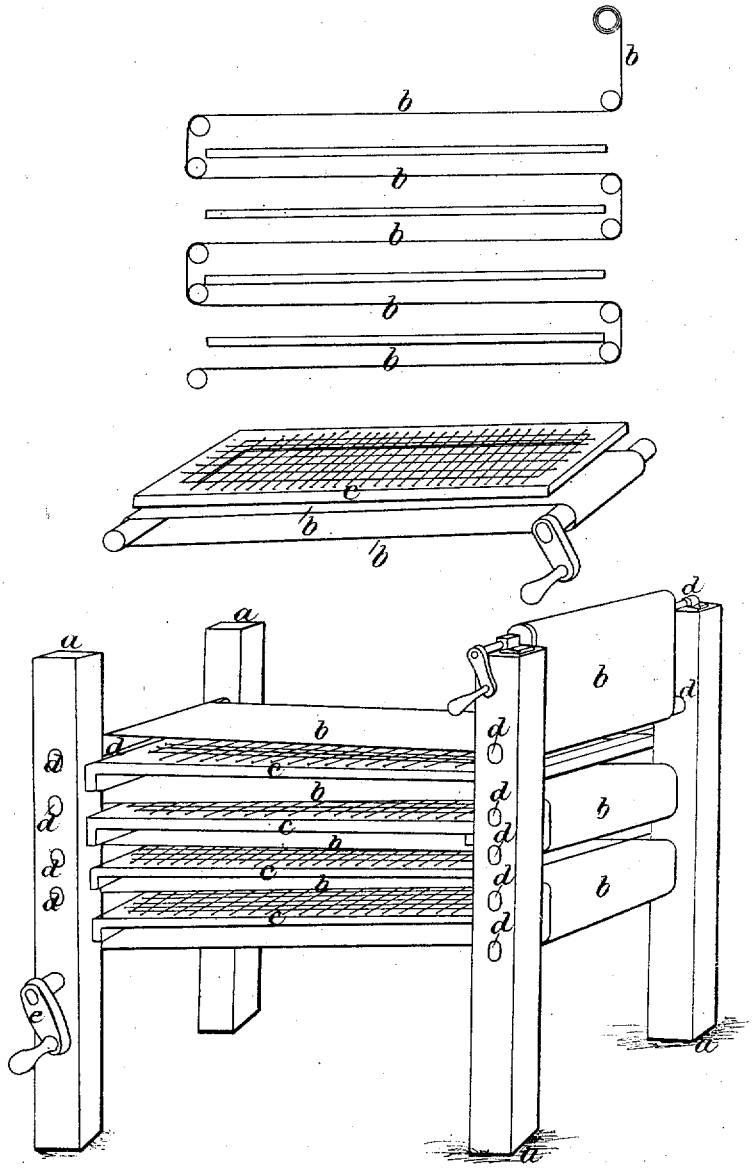
N. PETERS, PHOTO-LITHOGRAPHER, WASHINGTON, D. C.

9138X Oct. 6. 1835

Gamaliel Gay. Poughkeepsie Dutchess Co. New-York

The Schedule referred to in these Letters Patent and making part
of the same containing a description in the words of the said Ga-
maliel Gay himself of his improvement in the Hurdle for rearing
Silk worms.

To all to whom these presents shall come, I Ga-
maliel Gay of the Town of Poughkeepsie in the County of Dutchess
and State of New-York. Send Greeting.

The Hurdles for rearing and feeding silk worms
upon, are or should be made on a horizontal four sided frame of
convenient width and length and bottomed with cane or twine
either reticulated or having interstices between each slat of the
cane or thread of twine, which meshes or interstices should be of
such dimensions that the silk worm will lie and feed upon
them and the litter of the worms fall through.

Now Be it Known that I Gamaliel Gay Have in-
vented and applied to use a revolving apron for receiving upon it
and removing the Litter of the silk worms which falls through
the hurdles as above mentioned. The specification of which new
and useful invention for receiving and removing the litter of silk
worms is as follows. The revolving apron for a single hurdle is con-
structed by placing in a frame or otherwise at and immediately un-
der each end of the hurdle a roller or cylinder in length equal at
least to the width of the hurdle. Over these cylinders or rollers, ex-
tending from the outside of the periphery of the one to over and around
that of the other, is affixed an endless apron of cloth or other flexible
substance equal at least in width to the width of the hurdle. This
apron being drawn tight around the rollers and the ends fastened
together is made to revolve around both rollers by turning them by
a crank affixed to the axle of one of them, or by otherwise revolving
the rollers. The endless apron being thus constructed receives the litter
from the hurdle as it falls through, which litter causing a semi-

9138X revolution of the apron is removed from under the hurdles and
caused to fall in a heap at one and either end of the hurdles an
may be suffered to fall from the apron either upon the floor or in
a vessel placed at and partly under the end of the hurdle and
below the outer periphery of the roller. In case two or more hur-
dles be placed in tiers one above the other the same. the same apron
may be used, in which case an endless and separate apron is required
for each hurdle. But the best method, the most convenient and
least expensive form of apparatus, and which I claim as a con-
=stituent part of my invention is constructed as follows. Let there
be rollers or cylinders affixed under each end of each hurdle
the same as in case of a single hurdle, to one roller below the
lower hurdle attach one end of an apron of the kind and propor-
=tionate width first above specified. let this apron pass under the
opposite roller over the roller next immediately above that, under
the roller next immediately above the first roller to which the apron
is attached over the next above roller and under the next opposite
One and so on according to the number of hurdles in the tier until
the apron reaches the last roller to which the apron should be attached
after adding to the length of the apron ~~should be attached after ad-~~
=~~ding to the length of the apron~~ at least the length of one of the hur-
=dles which should be rolled upon the last mentioned roller. The
apron thus passing under each hurdle receives all the litter falling
from each which litter is discharged, part at one end and part
at the other end of the hurdles by turning the first mentioned roller
so as to wind over and around it a quantity of the apron equal to
the length of the above hurdle, which winding causes an equal
quantity of the apron to unwind from the roller to which the other
end of the roller is attached, after the litter is thus discharged
from the apron. the apron is in part to be again wound around
the uper roller as first above mentioned so to remain until the lit-
=ter is again discharged

What I claim as my improvement and wish

10. 9138X 75 to secure by Letters Patent in the rearing of silk worms, is the application of a revolving apron or aprons placed under the hurdle upon which the worms are fed for the purpose of receiving and removing the litter falling from them, and this I claim whether the same be made exactly in the way described or in any other operating substantially on the same principle and by which a similar effect is produced.

Witnesses
William Pardon
Thos. P. Jones

Gamaliel Gay.

Patented 6th Oct. 1835.

(936 words)

Drawing [illegible]